(12) United States Patent
Peck

(10) Patent No.: US 7,795,544 B2
(45) Date of Patent: Sep. 14, 2010

(54) RECESSED ELECTRICAL OUTLET BOX FOR CONCRETE FLOORS

(75) Inventor: David M. Peck, Danbury, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 11/889,347

(22) Filed: Aug. 10, 2007

(65) Prior Publication Data

US 2009/0038842 A1 Feb. 12, 2009

(51) Int. Cl.
*H02G 3/08* (2006.01)
(52) U.S. Cl. .................. 174/482; 174/480; 174/50; 174/53; 174/57; 220/3.2; 220/3.3
(58) Field of Classification Search ........... 174/480, 174/841, 50, 53, 57, 58, 483–490, 66, 67; 220/3.2–3.9, 4.02, 241, 242; 248/906; 439/535, 439/536
See application file for complete search history.

(56) References Cited

U.S. PATENT DOCUMENTS

| | | | |
|---|---|---|---|
| 2,559,151 A | 7/1951 | Getzoff | |
| 3,343,704 A | 9/1967 | Terry | |
| 3,912,106 A | 10/1975 | Traupe | |
| 3,956,573 A | 5/1976 | Myers et al. | |
| 4,323,724 A | 4/1982 | Shine | |
| 4,331,832 A | 5/1982 | Curtis et al. | |
| 5,032,690 A | 7/1991 | Bloom | |
| 5,410,103 A | 4/1995 | Wuertz | |
| 5,422,434 A | 6/1995 | Wuertz et al. | |
| 5,466,886 A | 11/1995 | Lengyel et al. | |
| 5,641,940 A | 6/1997 | Whitehead | |
| 5,783,774 A | 7/1998 | Bowman et al. | |
| 6,179,634 B1 * | 1/2001 | Hull et al. | 174/485 |
| 6,265,662 B1 * | 7/2001 | Riedy et al. | 220/3.8 |
| 6,450,353 B1 * | 9/2002 | Riedy et al. | 174/485 |
| 6,790,084 B1 * | 9/2004 | Osborn et al. | 174/485 |
| 6,843,669 B2 * | 1/2005 | Drane et al. | 439/142 |
| 7,276,662 B2 * | 10/2007 | Drane | 174/66 |

* cited by examiner

*Primary Examiner*—Angel R Estrada
(74) *Attorney, Agent, or Firm*—Kevin M. Barner; Mark S. Bicks; Alfred N. Goodman

(57) ABSTRACT

An outlet box assembly for installation within a concrete floor, or any other type of poured flooring, includes a housing for accommodating a receptacle assembly with an electrical power and/or data receptacle as well as the wiring connected to the receptacle and the receptacle assembly has a self adjusting attachment ring that accommodates the tapered inner walls of the housing and the receptacle assembly accommodates either a standard electrical outlet or a multimedia outlet with connections for power and one or more of voice data and audio video data.

20 Claims, 5 Drawing Sheets

RECESSED ELECTRICAL OUTLET BOX FOR CONCRETE FLOORS

FIELD OF THE INVENTION

The present invention relates generally to a recessed electrical outlet assembly and more particularly to a recessed electrical outlet assembly installable in a concrete floor, or within some other pourable type material, and including a self-centering diameter adjustable mounting mechanism for a recessed receptacle and a tethered sealable contaminant device.

BACKGROUND OF THE INVENTION

Electrical outlet floor boxes for placement within a concrete floor are well known in the industry for providing convenient access to power and/or data communications. Typical outlet floor boxes for such an application are placed beneath the floor and within the poured material and are configured to receive an electrical receptacle. FIG. 1 illustrates one such known outlet floor box for installation underneath a floor. After a floor box such as the one shown in FIG. 1 is installed and the flooring material, such as concrete, is poured around the box, the floor box is cut flush with the top of the flooring material and an electrical component, such as an electrical power receptacle and/or a communication receptacle, is installed within the box.

For example, U.S. Pat. No. 5,466,886 to Lengyel et al. and assigned to Hubbell Incorporated discloses an electrical outlet box assembly for power and communication wires. As disclosed in Lengyel, an electrical box assembly includes a housing such as the one shown in FIG. 1, a wiring enclosure releasably coupled within the housing for separating and insulating power and communication wires from each other, a receptacle insulator member coupled to the wiring enclosure for insulating an electrical receptacle and a receptacle mounting member for releasably mounting the receptacle thereto. The receptacle is attached to the mounting member and four retaining clips are attached to the receptacle mounting member and placed within the top of channels to couple the receptacle mounting member with receptacle attached to the housing. Once installed, the receptacle is flush with the top of the floor surface.

U.S. Pat. No. 5,783,774 to Bowman et al. discloses a non-metallic floor box similar to the one shown in FIG. 1 but having a plurality of vertically aligned indexing teeth formed in the interior of the housing side wall. An adapter ring is sized for insertion into the housing and a plurality of flanges extending from the periphery of the adapter ring are positioned to reciprocally mate with the sets of teeth inside the housing wall. An electrical receptacle is attached to the top of the adapter ring and adapter ring is installed within the housing such that the receptacle is flush with the top of the flooring material.

One disadvantage with respect to the related art floor boxes, including those described above, is that due to manufacturing practices common in the industry, the interior sidewalls of floor boxes such the one depicted in FIG. 1 are tapered. More particularly, the floor boxes are typically made of a non-metallic material, such as plastic, and are formed into their respective shapes on a molding machine. In order to remove the molded floor box from the machine, the upper tube portion of the box is tapered, that is, it is wider at the top of the box and gets narrower down closer to the cavity portion of the box where the wiring typically enters. The mechanisms used to attach the receptacles to the box housing in related art devices are insufficient to accommodate for this taper. More specifically, oftentimes due to the amount of the tube portion that is cut from the top of the floor box, the portion of the tube to which the receptacle must be attached is too narrow to adequately accommodate the attachment mechanism provided to attach the receptacle to the housing.

There remains a need, therefore, for an electrical outlet floor box having an electrical receptacle attachment mechanism that accommodates for this taper and that addresses other problems attendant with conventional outlet box fixtures.

SUMMARY OF THE INVENTION

The present invention is directed to an adjustable recessed electrical outlet assembly that is easy to manufacture and install and is sealed from contaminants when an electrical receptacle installed within the housing is not in use.

One aspect of the invention is to provide an outlet box assembly with a housing configured with at least an open upper tube portion, a lower cavity portion below the tube portion and a base portion below the cavity portion and sealing the cavity portion, and a receptacle assembly inserted at least partially within the tube portion of the housing, where the receptacle assembly has at least a ring device that contacts an inner wall of the tube portion of the housing and the diameter of the ring device is configured to self adjust to a change in the diameter of the inner wall of the housing as the ring device is inserted into the housing.

Another aspect of the invention is to provide a cover assembly that protects the receptacle from contamination when not in use as well as from physical damage from people or other objects.

A still further aspect of the invention is to provide a cover assembly with a tethered sealable contaminant device that seals openings in a door cover in the plate when a respective receptacle is not in use and which is stored below the cover plate when the receptacle is in use or otherwise exposed.

Various aspects of the invention are basically attained by providing, in one embodiment, an outlet box assembly with a housing configured with at least an open upper tube portion, a lower cavity portion below the tube portion and a base portion below the cavity portion and sealing the cavity portion, and a receptacle assembly inserted at least partially within the tube portion of the housing, where the receptacle assembly has at least a ring device that contacts an inner wall of the tube portion of the housing and the diameter of the ring device is configured to self adjust to a change in the diameter of the inner wall of the housing as the ring device is inserted into the housing.

Further aspects of the invention are attained by providing a receptacle assembly for housing an electrical receptacle within a concrete floor, the assembly sized such that it fits at least partially within a wiring housing within the concrete, the assembly including an attachment ring portion sized to fit snug against inner walls of the wiring housing, wherein the attachment ring portion is configured such that its outer diameter decreases as it is pushed into a narrower portion of the inner walls of the wiring housing.

Still further aspects of the invention are attained by providing an outlet box assembly that is compatible with a multipurpose receptacle, such as the JLOAD™ receptacle manufactured by Hubbell, Inc., where the box provides means for conveniently attaching to the receptacle.

Still further aspects of the invention are attained by providing an outlet box assembly with a flange that has two opposing end portions and at least two respective attachment tabs corresponding to and integral with one of the end portions, wherein the attachment tabs each comprise mounting holes operable to accommodate corresponding mounting holes in the electrical receptacle and wherein further, the end portion of the flange has a notch for accommodating a respective structural component of the electrical receptacle.

Still further aspects of the invention are attained by providing an outlet box cover assembly for covering an electrical outlet box, the assembly having a tapered recessed box with a narrow opening at one end and a wide opening at an opposing end, wherein the wide opening is larger than the narrow opening in at least one dimension and a cover plate mechanically attached to the tapered recessed box and including an aperture corresponding to the wide opening in the tapered recessed box.

Still further aspects of the invention are attained by providing a method of installing a receptacle assembly for supporting an electrical receptacle within a concrete floor, the method including attaching an attachment ring portion to the bottom of a carpet flange device, wherein the bottom of the carpet flange device has an outer diameter smaller than the outer diameter of an outer surface of the attachment ring device, applying an adhesive material to the outer surface of the attachment ring portion, inserting the attachment ring portion with the carpet flange attached into a tapered tubular portion of a wiring housing located within the concrete floor, wherein the outer diameter of the outer surface of the attachment ring device decreases as the attachment ring traverses the tapered tubular portion of a wiring housing and securing the attachment ring device to the tapered tubular portion of the wiring housing with the adhesive.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF EXEMPLARY EMBODIMENTS

Exemplary embodiments of the present invention are discussed in detail below. While specific configurations are discussed, it should be understood that this is done for illustration purposes only. A person skilled in the relevant art will recognize that other components and configurations may be used without departing from the spirit and scope of the invention.

The present invention is directed to a recessed electrical outlet box assembly that can be mounted directly within virtually any known non-metallic floor box within a solid floor, such as a concrete floor. It will be understood that although the embodiments described below refer to a concrete floor for use with the disclosed assembly, the device is not limited for use with concrete alone. As will become apparent, the type of flooring material used is not relevant to the instant device.

The present invention, in one exemplary embodiment, is an integrated floor box housing with a receptacle assembly that easily inserted within the tube portion of the housing and attached to the inside wall of the housing. As described in detail below, the receptacle assembly in accordance with this exemplary embodiment has a self-adjusting mechanism that automatically accommodates for tapered interior walls of the housing. Accordingly, regardless of where the floor box housing is cut, i.e., such that the top of the housing is flush with the top of the concrete floor once poured and hardened, the receptacle assembly can be installed within the housing and securely fastened to the housing wall.

Figure 1:
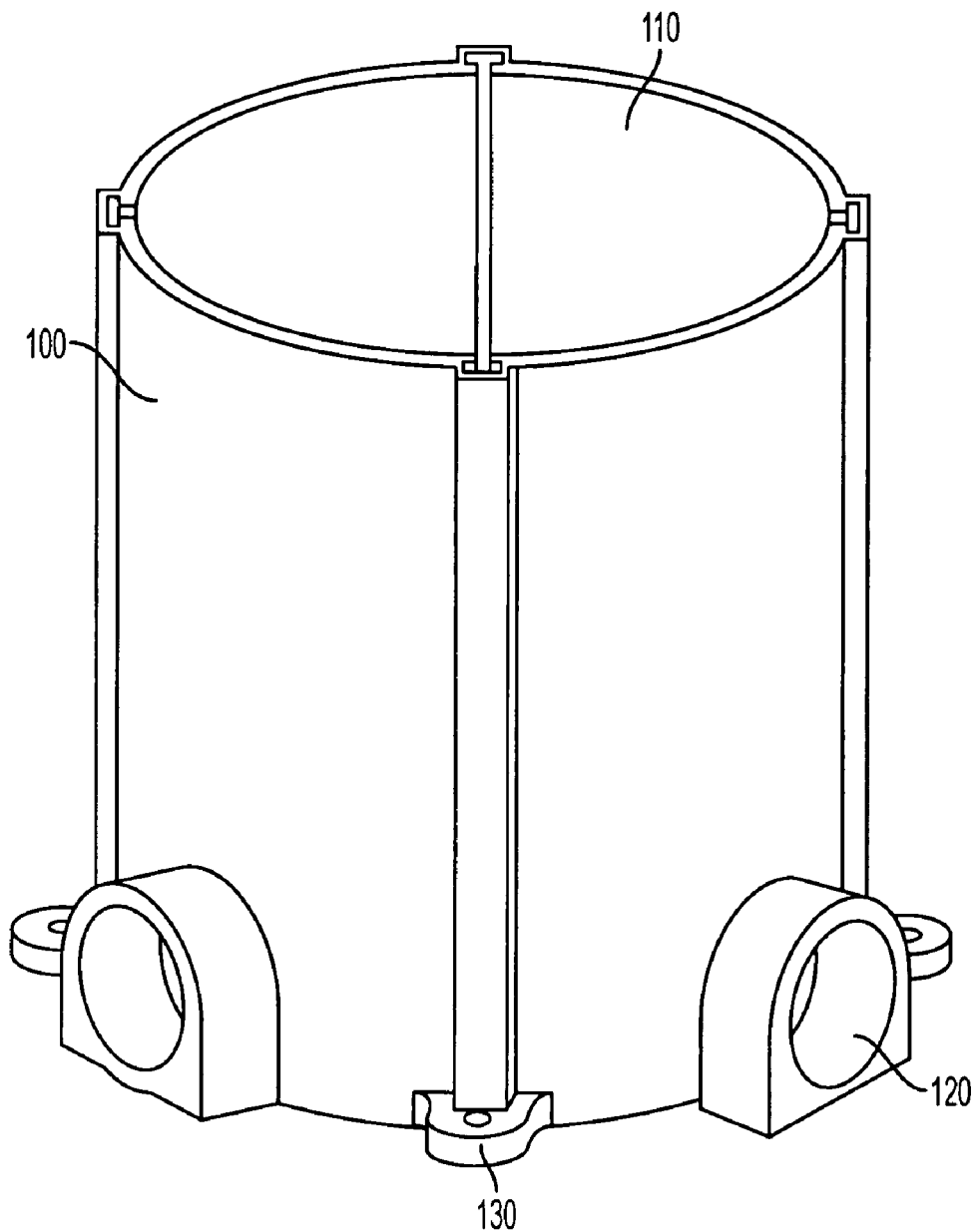
FIG. 1 is a perspective view of a conventional outlet floor box known in the art for accommodating an electrical receptacle within a concrete floor.
Figure 2A:
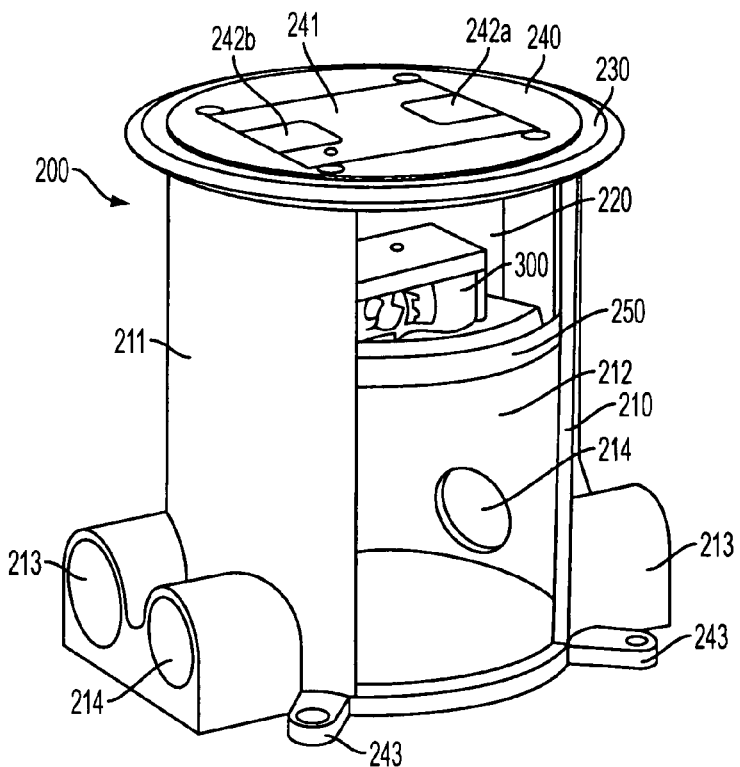
FIG. 2a is a cutaway view of the outlet box assembly according to a first embodiment of the invention.

FIG. 2a is a detailed cutaway illustration of one exemplary embodiment of an electrical outlet box assembly 200 in accordance with the present invention.

As shown in FIG. 2a, plastic floor box housing 210 is provided with an upper tubular portion 211 and a lower cavity portion 212. Wiring access holes are provided at the base of cavity portion 212. Specifically, in this embodiment, access holes 213 and 214 provide access into the floor box for power cables and data and/or communication cabling. The receptacle assembly according to this illustrated embodiment includes self-leveling ring 250, recessed receptacle flange 220 and carpet flange 230. As described in detail below in reference to FIG. 3, electrical receptacle 300 is attached to the lower portion of receptacle flange 220 providing easy access by the wiring entering through the access holes 213 and/or 214. Flange cover 240 installs within a recess in the carpet flange 230 and is provided with a hinged door cover 241 with separate sealed access holes 242a, 242b for providing independent access to either side of receptacle 300.

Figure 2B:
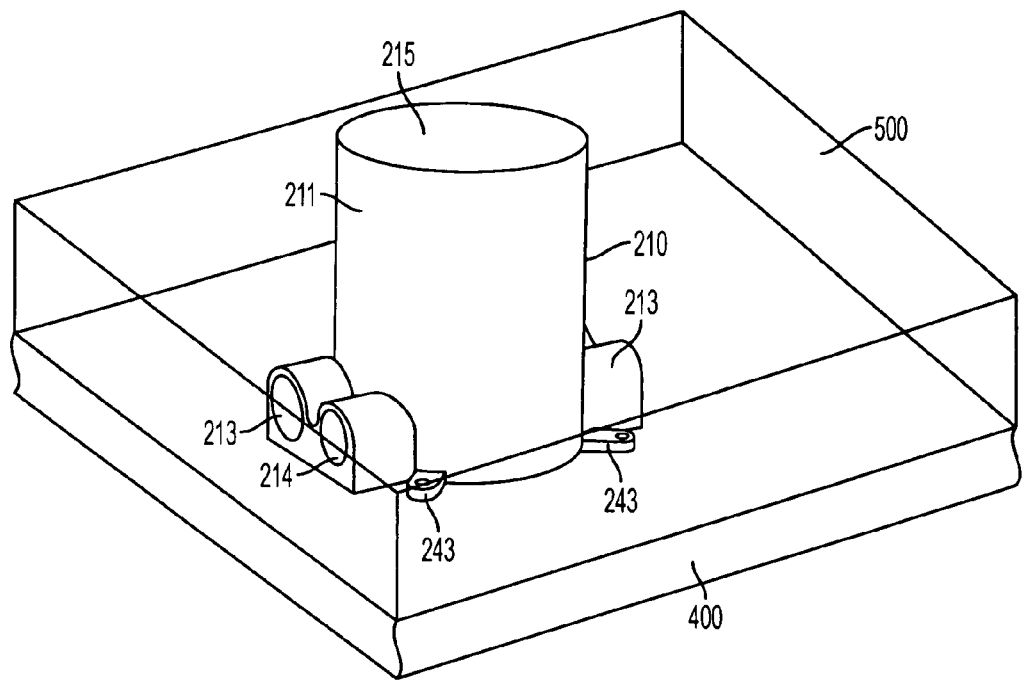
FIG. 2b is a perspective view showing how a floor box in accordance with the present invention is located within a concrete floor.

Referring to FIG. 2b the method of installing the floor box assembly shown in FIG. 2a will now be described. In particular, floor box housing 210 is installed in a desired location on the top surface of a sub-floor, or grade, 400. Housing 210 is attached to the sub-floor 400 using fasteners, such as nails, driven through attachment rings 243. Wiring, such as power cables and/or data communication cabling (not shown) is then provided through access holes 213 and 214 and the ends of the wiring are left within the bottom cavity portion of the housing. The top opening 215 of the housing at the upper-most part of tubular portion 211 is then covered to prevent any concrete or other debris from entering the inside of the housing from the top. Concrete 500 is then poured over the top of the sub-floor 400 surrounding and covering the bottom part of the housing 210. After concrete 500 hardens, the top tube portion 211 of box 210 is cut at the height of the top of the concrete.

Figure 3:
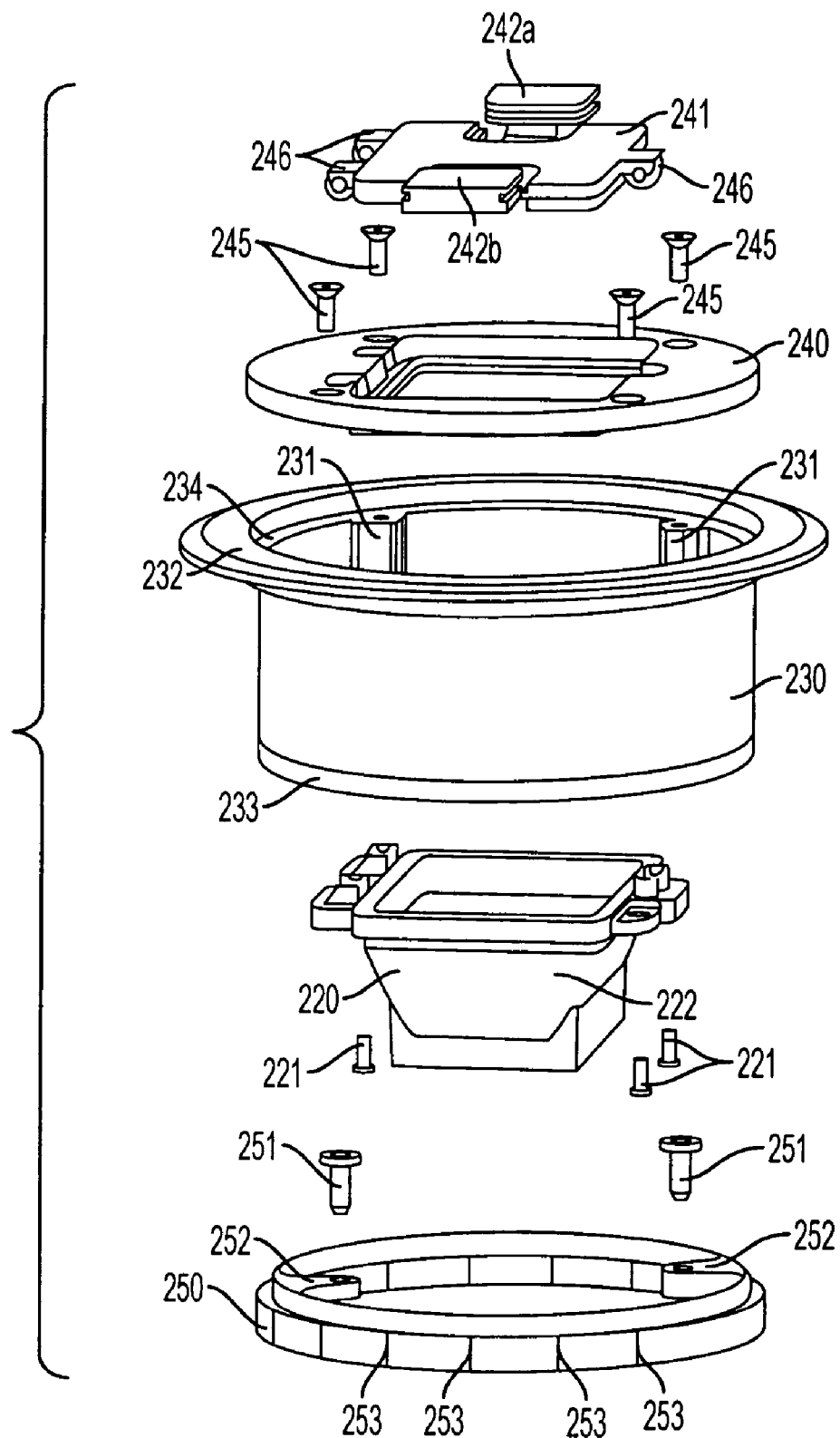
FIG. 3 is an exploded view showing the main parts of a receptacle assembly in accordance with the present invention.

FIG. 3 is an exploded view of a receptacle assembly installable within the floor box housing shown in FIG. 2b, in accordance with the present invention. A description is provided of the assembly process with respect to each component of the overall assembly.

Figure 5:
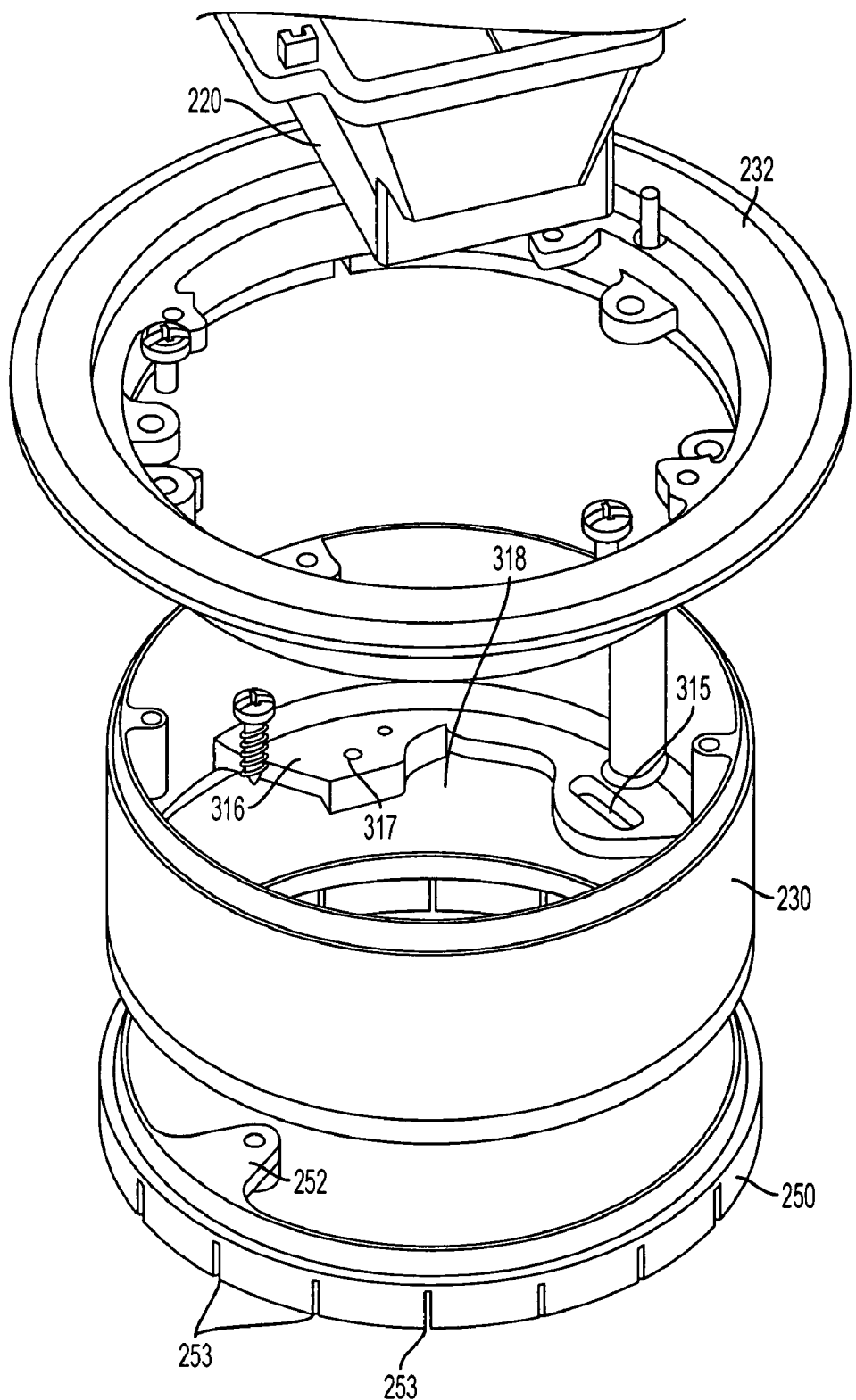
FIG. 5 is a further exploded view showing additional details of certain parts of a receptacle assembly in accordance with the present invention.

Ring 250 is attached to the bottom of carpet flange 230 via fasteners, such as screws 251. According to the embodiment shown, screws 251 are placed through slotted holes 315 (FIG. 5) in a flange portion within the interior of carpet flange 230. The interior of the carpet flange, including the slotted attachment holes 315, are shown in FIG. 5. Screws 251 are placed through the slotted holes in the carpet flange and fastened to respective screw holes in attachment portions 252 of ring 250. In accordance with the embodiment illustrated in FIG. 3, the outer diameter of the bottom of carpet flange 230 is less than the outer diameter of ring 250. Accordingly, when the ring and flange assembly is inserted within the tube portion 211 of box 210, as described below, the outer portion of ring 250 contacts the inner wall of the floor box and not the outer portion of carpet flange 230.

FIG. 5 also shows an interior flange portion extending from an interior wall of the cylindrical sidewall of the carpet flange 230 and which includes an attachment tab portion 316 with mounting holes 317. The mounting holes 317 in the attachment tab portion 316 include respective holes located such that they align respectively with either mounting holes in a multimedia outlet device that accommodates power and one or more of voice data and audio video data, such as a JLOAD™ outlet, which provides connections for power, Category-5 (Cat-5) and coaxial or mounting holes for a standard power receptacle. Additionally, notches 318 are provided in the attachment tab portion 316 for accommodating respective structural components of the multimedia outlet when the multimedia outlet is mounted to the receptacle assembly.

Regarding the slotted holes 315 (FIG. 5) in the carpet flange, once the receptacle ring and flange assembly is secured in place within the floor box tube, the slotted holes 315 (FIG. 5) in the carpet flange permit the entire balance of the receptacle assembly to be rotated up to approximately 20 degrees with respect to the ring 250 by loosening screws 251 slightly. This might be desirable, for example, if after installation of the assembly, it is realized that the receptacle is not aligned as desired with certain furniture, the flooring material, or the like.

The carpet flange assembly with the ring 250 attached is secured to the interior wall of the floor box 210 (FIG. 2a) by placing an adhesive, such as PVC glue, or the like, to the outer portion of the ring 250. The ring and flange assembly is then inserted into the tube portion 211 of the floor box and pushed down until the underside of lip portion 232 of the carpet flange 230 rests on top of the flooring material, such as carpeting, hardwood flooring, and the like, which is installed on the top of concrete 500 (FIG. 2b). As mentioned above, it is typical for the interior tube portion 211 of floor box 210 to be tapered such that the lower portion of the tube is more narrow than the upper portion near the opening 215 (FIG. 2b). In accordance with one aspect of the present invention, to accommodate for this taper in the tube portion 211, ring 250 is provided with slotted serrations 253 around its circumference.

Serrations 253 in ring 250 permit ring 250 to close in on itself as it is squeezed more and more by the tapering, narrowing, interior wall of tube 211 as the ring and flange assembly is inserted into the floor box. After the ring and flange assembly is inserted all the way into the floor box opening, ring 230 will be located at the necessary location within the tube 211 to ensure proper leveling of the receptacle assembly for future installations. That is, because the ring 250 is secured to the bottom of flange 230, as described, it is parallel with the outer flange lip 232 that rests on top of the floor. Thus, if for some reason it is desirable to replace the flange assembly 230 it can be unfastened from ring 250. Because ring 250 is securely fastened to the interior wall of the box 210, it remains parallel with the floor and any replacement flanges 230 can be easily fastened to the ring and immediately be parallel to the floor.

Referring again to FIG. 3, tapered recessed receptacle box 220 is attached to the underside of door cover assembly 240 via fasteners, such as rivets 221 or the like. The outer diameter of cover assembly 240 is sized such that the top portion of the assembly 240 fits snugly within lip portion 234 at the top of the carpet flange assembly 230. The cover assembly 240 is attached to the carpet flange assembly via fasteners such as screws 245, or the like, screwed into respective receiving holes in standup portions 231 on the interior wall of carpet flange assembly 230.

Hinged door cover assembly 241 is provided with one or more hinges 246 that mate with respective receiving portions in the top surface of cover assembly 240. Once installed, door 241 is able to pivot open to provide access to the interior of receptacle box 220 and pivot closed to cover the opening in cover assembly 240 and seal the opening to the receptacle. To aid in sealing the receptacle assembly against moisture or particulate debris, gaskets are optionally provided on lip 234 of carpet flange assembly 230 and/or around the opening of cover assembly 240 where door 241 mates therewith.

Further, according to the embodiment shown in FIG. 3, door cover assembly 241 is provided with separate gaskets 242a and 242b for sealing corresponding openings in the surface of the door 241.

Figure 4:
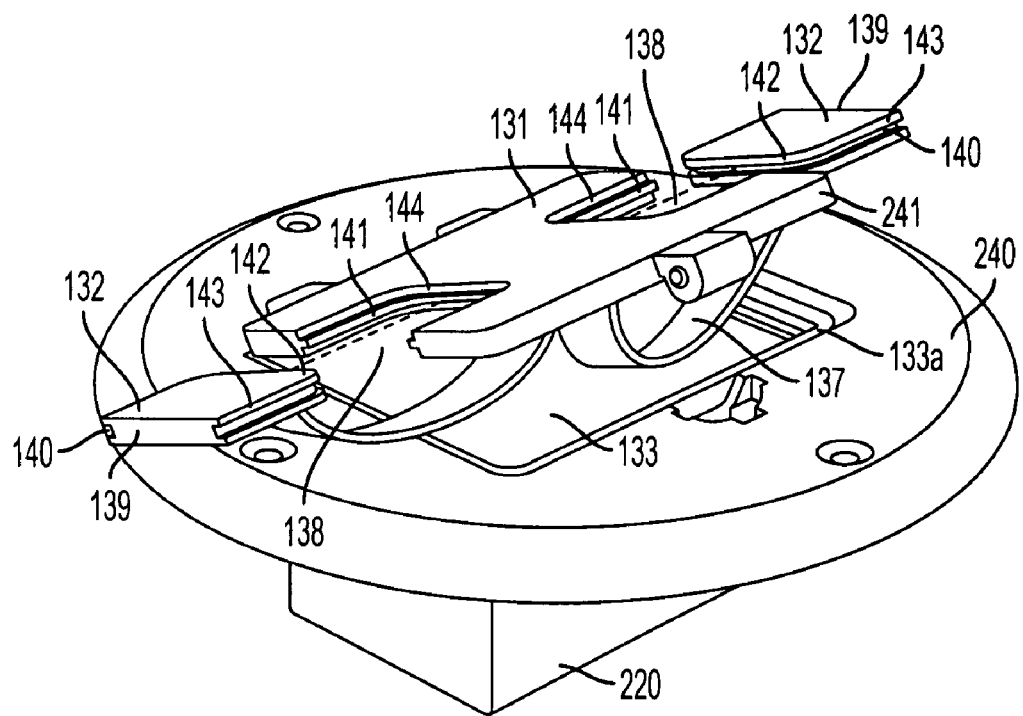
FIG. 4 is a perspective view of a hinged door cover assembly in accordance with the present invention.

FIG. 4 is a detailed illustration of a door cover assembly 241 hingedly attached to cover assembly 240 and the associated tethered gasket seals consistent with the embodiment of the invention described above in connection with FIGS. 2a and 3. In particular, door 131 includes two apertures 138 which are open at respective ends of the door 131. Each aperture 138 is either sealed or opened by the respective placement or removal of gasket members 242a, 242b. In accordance with the illustrated embodiment in FIG. 4, each gasket member 242a, 242b is substantially flat on a backside 139 corresponding to the open end of door 131, and has a groove 140 extending around the remainder of the side surface of the gasket. Apertures 138 include a ledge 141 that corresponds directly with grooves 140 in gasket members 242a, 242b and which is slightly wider than the corresponding groove in order to provide a tight seal around the sides of the aperture 138 when the gasket is in place.

The apertures 138 and corresponding gasket members 242a, 242b can be of any convenient shape to provide access to the receptacle 300 (FIG. 2a) below, however, the exemplary embodiment shown in FIG. 4 illustrates a substantially rectangular aperture/gasket with curved inside corners 142. Curved inside corners 142 provide for increased sealing properties and further provide a 'keying' mechanism so the gasket will not be inserted in the corresponding aperture with an incorrect orientation. Also, according to a further embodiment, the height of the portion 143 of the gasket 242a, 242b above the groove 140 is substantially the same dimension as the height of the portion 144 of aperture 138 above ledge 141. Accordingly, when gasket 242a, 242b is inserted in aperture 138, the top of gasket 242a, 242b is flush with the top surface of door 131, as illustrated in FIG. 2a.

According to the embodiment illustrated in FIG. 4, gaskets 242a, 242b are attached to the underside of hinged door 131 with tethers 137 and, thus, a convenient mechanism by which access holes 138 in the surface of door 131 are covered and sealed is provided when, for example, a plug is not plugged into a receptacle 300 (FIG. 2a). More particularly, after a plug is inserted into one or more receptacles, the gasket 242a, 242b covering the hole in the door corresponding to the respective used receptacle can be removed allowing the cord attached to the plug to conveniently pass through the respective aperture 138 in door 131. Further, as shown in FIG. 4, gaskets 242a, 242b are tethered to the underside of door 131 via respective tethering straps 137 so when they are removed from their respective aperture, they are out of the way and stored within recessed receptacle flange 220.

According to at least one embodiment, tethering straps 137 are integral with gaskets 242a, 242b. The material used to make gaskets 242a, 242b can be any material that enables the gaskets to easily slide from its respective hole in door 131. However, according to the illustrated embodiment of FIG. 4, the gaskets 242a, 242b as well as tethering straps 137 are made of a flexible rubber or neoprene material which provides an ideal sealing quality to the door holes when the gaskets are in place. In this manner, water, dirt and other contaminants are prevented from entering the holes in door 131 when the door 131 is closed. As mentioned above, to provide additional protection from contaminants, an optional gasket 133a is placed around the perimeter of the aperture 133 in cover assembly 240.

It would be understood that a device or method incorporating any of the additional or alternative details mentioned above would fall within the scope of the present invention as determined based upon the claims below and any equivalents thereof. For example, according to one exemplary embodiment, the ring portion 250 which is attached to the inner wall of the floor box housing is made of plastic, such as PVC, the same as the housing itself, and the carpet flange 230 and door cover assembly 240 are made of nylon. Accordingly, when PVC glue is used to secure the PVC ring to the PVC housing, inadvertent glue transfer from the ring to the flange or door cover assembly will be harmless since PVC glue will not adhere to nylon. Further, a skilled artisan would understand that materials other than those expressly disclosed herein can be used to manufacture the component parts. For instance, one or more of the carpet flange 230, door cover assembly 240 and receptacle box 220 can all be made of metal material to provide a different look and feel for the device.

Other aspects, objects and advantages of the present invention can be obtained from a study of the drawings, the disclosure and the appended claims.

What is claimed is:

1. An outlet box assembly comprising:
   a housing configured with at least an open upper tube portion, a lower cavity portion below the tube portion and a base portion below the cavity portion and sealing the cavity portion; and
   a receptacle assembly inserted at least partially within the tube portion of said housing, said receptacle assembly having at least a continuous ring device that contacts a tapered inner wall of the tube portion of said housing, wherein the diameter of the ring device is configured to self adjust to a change in the diameter of the tapered inner wall of said housing as the ring device is inserted within said housing.

2. The outlet box assembly as claimed in claim 1, wherein the ring device is made of the same material as said housing.

3. The outlet box assembly as claimed in claim 1, wherein said receptacle assembly further includes a tubular flange device with top and bottom open ends and a cylindrical sidewall.

4. The outlet box assembly as claimed in claim 3, wherein the bottom end of the tubular flange device is removably attached to the ring device.

5. The outlet box assembly as claimed in claim 4, wherein the tubular flange device is rotatable with respect to the ring device.

6. The outlet box assembly as claimed in claim 3, wherein said receptacle assembly further includes a door cover assembly having a top plate portion with an aperture therein and a tapered receptacle access portion disposed below the aperture.

7. The outlet box assembly as claimed in claim 6, wherein door cover assembly further includes a door hingedly attached to cover the aperture in the door cover assembly, wherein the door includes at least one aperture and at least one gasket tethered to the top plate and that sealingly covers the aperture in the door.

8. The outlet box assembly as claimed in claim 3, wherein the tubular flange device further has an interior flange portion extending from an interior wall of the cylindrical sidewall and which includes an attachment tab portion with mounting holes, the mounting holes in the attachment tab portion including holes located such that they align respectively with mounting holes in a multimedia outlet which provides connections for power and one or more of voice data and audio video data when the multimedia outlet is mounted to the receptacle assembly, and notches are provided in the attachment tab portion for accommodating respective structural components of the multimedia outlet when the multimedia outlet is mounted to the receptacle assembly.

9. The outlet box assembly as claimed in claim 1, wherein the ring device is fixedly attached to the inner wall of the tube portion of said housing.

10. The outlet box assembly as claimed in claim 1, wherein the ring device is made of PVC.

11. The outlet box assembly as claimed in claim 10, wherein the ring device is fixedly attached to the inner wall of the tube portion of said housing via PVC glue.

12. An outlet box assembly comprising:
   a housing configured with at least an open upper tube portion, a lower cavity portion below the tube portion and a base portion below the cavity portion and sealing the cavity portion; and
   a receptacle assembly inserted at least partially within the tube portion of said housing, said receptacle assembly having at least a ring device that contacts an inner wall of the tube portion of said housing, wherein the diameter of the ring device is configured to self adjust to a change in the diameter of the inner wall of said housing as the ring device is inserted within said housing,
   wherein the ring device comprises a plurality of vertical serrations disposed in an outer surface of the ring device from a bottom surface of the ring and extending partially up the outer surface of the ring device.

13. A receptacle assembly for housing an electrical receptacle within a concrete floor, the assembly sized such that it fits at least partially within a wiring housing within the concrete, the assembly comprising:
   a continuous attachment ring portion sized to fit snug against tapered inner walls of the wiring housing, wherein said attachment ring portion is configured such that its outer diameter decreases as it is pushed into a narrower portion of the tapered inner walls of the wiring housing.

14. A receptacle assembly as claimed in claim 13, wherein the attachment ring portion includes a plurality of vertical slots spaced equidistant from each other around the circumference of the attachment ring.

15. A receptacle assembly as claimed in claim 13, further comprising a tubular flange attached to said attachment ring portion at a bottom end thereof and having at least one attachment tab with alternative first and second sets of mounting holes, the first set of mounting holes being located such that they align with corresponding mounting holes on a standard electrical receptacle and the second set of mounting holes being located such that they align respectively with mounting holes in a multimedia outlet which provides connections for power, Category-5 (Cat-5) and coaxial when the multimedia outlet is mounted to the receptacle assembly, and notches are provided in the attachment tab portion for accommodating respective structural components of the multimedia outlet when the multimedia outlet is mounted to the receptacle assembly.

16. A receptacle assembly as claimed in claim 13, further comprising a hinged door having at least one opening with a corresponding sealing device tethered to the hinged door, wherein the sealing device is operable to selectively open or seal the opening.

17. A method of installing a receptacle assembly for supporting an electrical receptacle within a concrete floor, the method comprising:

attaching a continuous attachment ring portion to the bottom of a carpet flange device, wherein the bottom of the carpet flange device has an outer diameter smaller than the outer diameter of an outer surface of the attachment ring device;

applying an adhesive material to the outer surface of the attachment ring portion;

inserting the attachment ring portion with the carpet flange attached into a tapered tubular portion of a wiring housing located within the concrete floor, wherein the outer diameter of the outer surface of the attachment ring device decreases as the attachment ring traverses the tapered tubular portion of the wiring housing; and securing the attachment ring device to the tapered tubular portion of the wiring housing with the adhesive.

18. The method of installing a receptacle assembly as claimed in claim 17, further comprising rotating the carpet flange device with respect to the attachment ring portion.

19. The method of installing a receptacle assembly as claimed in claim 17, further comprising attaching a multimedia outlet to the carpet flange device, wherein the multimedia outlet includes connections for power and one or more of voice data and audio video data.

20. The method of installing a receptacle assembly as claimed in claim 17, further comprising:

attaching an electrical outlet device to the carpet flange device, wherein the electrical outlet device is recessed below a top surface of the floor; and attaching an outlet cover assembly to the carpet flange device, wherein the outlet cover assembly has a first aperture at one end thereof and a second aperture smaller than the first aperture at a second end, and wherein further, the second aperture has the same outer dimension as the electrical outlet device.

* * * * *